(12) United States Patent
Zeitler (10) Patent No.: US 6,263,762 B1
(45) Date of Patent: Jul. 24, 2001

(54) PROCESS AND DEVICE FOR IDENTIFYING ANIMALS

(76) Inventor: Markus Zeitler, Sonnhalde 7, CH-6206 Neuenkirch (CH)

( * ) Notice: Subject to any disclaimer, the term of this patent is extended or adjusted under 35 U.S.C. 154(b) by 0 days.

(21) Appl. No.: 09/367,413

(22) PCT Filed: Feb. 6, 1998

(86) PCT No.: PCT/CH98/00044

§ 371 Date: Aug. 23, 1999

§ 102(e) Date: Aug. 23, 1999

(87) PCT Pub. No.: WO98/35548

PCT Pub. Date: Aug. 20, 1998

(30) Foreign Application Priority Data

Feb. 12, 1997 (CH) ........................................ 299/97

(51) Int. Cl.$^7$ .................................................. B43K 5/00
(52) U.S. Cl. ............................................................. 81/9.22
(58) Field of Search ................................ 81/9.22; 30/358, 30/361, 362, 366

(56) References Cited

U.S. PATENT DOCUMENTS

| | | | |
|---|---|---|---|
| 4,286,599 | * | 9/1981 | Hahn et al. ............................ 128/316 |
| 4,440,078 | * | 4/1984 | McCrery, Jr. et al. ................... 101/4 |
| 4,488,550 | * | 12/1984 | Niemeijer .............................. 128/316 |
| 4,671,277 | * | 6/1987 | Beuchat ................................ 128/316 |

FOREIGN PATENT DOCUMENTS 1444355   7/1976  (GB) .

* cited by examiner

Primary Examiner—David A. Scherbel
Assistant Examiner—David B. Thomas
(74) Attorney, Agent, or Firm—Edwin D. Schindler (57) ABSTRACT

A device has ten needle pipes (12) containing movable needles (13) and arranged in two superimposed lines on a write head (7). Each needle pipe (12) is secured to a table (23) which can be motored-driven in two horizontal directions, so that the needle pipe opening (9) can be moved over a predetermined identification field on the animal skin. Programmed-controlled means (47–49; 56–58) are provided for making the needles (13) vibrate vertically at predetermined points within identification field, depending on the characters to be tattooed. The needle points thus vibrate out of the needle pipe opening (9) and penetrate into the animal skin down to a particular depth. The device is characterised in that it has a pumping device (38) for pumping the tattooing liquid downwards through the needle pipe (12) while the needle pipe (12) is moved at least in one direction of displacement, so that the needles (13) are forcibly and permanently surrounded by tattooing liquid during said displacement of the needle pipe (12).

10 Claims, 11 Drawing Sheets

PROCESS AND DEVICE FOR IDENTIFYING ANIMALS

BACKGROUND OF THE INVENTION

1. Technical Field of the Invention

This invention concerns both a process for marking animals, and a device for carrying out the process. It is becoming increasingly important to be able to mark slaughter stock in a way that ensures an animal's life can be traced from birth or acquisition right through to deboning in the slaughterhouse. With the disappearance of the personal relationship between meat producers and meat consumers and the impossibility, or extreme difficulty, of tracing meat on its way from the producer to the consumer, there is a rapidly growing interest among consumer groups in being able to identify with precision where a particular meat comes from, and hence to be able to draw conclusions about feeding and geographic origin as well. Neither would meat consumers be the only ones to benefit from such a means of marking. Producers would also like to have a means of marking that would ensure a professional quality control of their animals' breeding and feeding history, and generally allow them to monitor their livestock as comprehensively and individually as possible. Hence there is great interest in being able to reliably and precisely monitor the complete life history of each individual animal. The relevant data for each individual animal can then be processed systematically, providing a means of furnishing proofs, and of drawing conclusions. It would allow e.g. vaccinations, feeds, weight and size measurements etc., drugs administered, other treatments, pedigree and all kinds of other data to be systematically recorded and reliably attributed to an individual animal. Just like slaughter stock producers, animal breeders also have to monitor the life histories of their animals with care, and regularly record important data as a means of ensuring successful breeding on a systematic basis. Here too, animal and meat traders' organizations at every level, processing plants and sales organizations are all interested in being able to trace the life history of each individual animal. In all cases, the prerequisite for reliable monitoring and this degree of traceability is a reliable means of marking the animals.

2. Description of the Prior Art

There are numerous different methods of marking animals. An animal can be given an ear tag, for example, or an ear tattoo. These tattoos are applied with forceps, which means that the tattoo site has to be accessible from both sides. But e.g. pigs' ears are often extremely dirty, however, or parts of the ears may even be torn away if the pig is injured, so that tattoos are difficult or impossible to read. And at the slaughterhouse the animal heads, together with the ears, are separated from the body very early on, so that the meat-bearing carcass is no longer identifiable.

Tattoos per se are very reliable, however, because they are permanent and grow with the animal. Until now, the problem with tattooing has always been applying the tattoo. Various prior art tattooing instruments exist for applying tattoos to body sites that can only be accessed from one side. These instruments have one or more tattooing needles which execute a rapid up and down movement like a sewing machine needle, thereby penetrating the animal skin to a certain depth. Before, during or immediately after the needles are applied, the tattoo site is swabbed with an antiseptic tattooing liquid containing a suitable dye, which then flows into the holes and fixes itself permanently in the skin.

European Patent Application No. 0,006,395. discloses a process and a device for marking animals. In this process part of the device, namely the write head of the tattooing instrument, is applied to the surface of the animal's skin. A vacuum is then created between the skin and this write head, whereupon the skin is securely sucked against the write head of the tattooing instrument. Pre-selected marks are then punched into the skin using tattooing needles, and tattooing liquid is forced into the holes by the tattooing needles at the same time. On completion of the tattooing process, the vacuum is relieved by letting air in between the skin and the instrument, and the instrument is then removed from the surface of the skin, resp. the animal. Before this instrument can be used, however, the tattoo site has to be swabbed with tattooing liquid. Only then can the actual tattooing proceed with the instrument. There is no facility for supplying the tattooing liquid automatically, and the only information given is that tattooing liquid can be supplied in the known manner. Practice has shown, however, that a means of automatically supplying tattooing liquid as described e.g. in British patent 1'444'355, will not work with an instrument of this type.

This United Kingdom Patent Application No. 1,444,355 proposes a tattooing instrument like a hand-held compass saw, with the individual characters having actually to be written by moving the instrument on the animal's skin. The British patent further teaches that the housing element containing the needles can include a chamber into which pigments could be introduced. In practice, however, the liquid in the needle container dries up quickly when the instrument is not used, with the result that the fine needles and feeder lines unavoidably seize up.

No tattooing instrument has yet proved reliable, and none is used widely within the sector. They are either too time-consuming to use because too much preparation is required for each tattoo, or they do not function reliably in the long-term. Furthermore, the marks that can be tattooed are often insufficiently variable, or it takes too long to apply a tattoo if, despite the lack of variability, one still wants to tattoo a longer mark.

Hence it is the task of this invention to propose a process and a device for individually marking animals, designed to overcome the disadvantages already mentioned. The process must be reliable, i.e. from the moment it is applied, the mark must remain indelible and legible at all times on the animal so that even after it is slaughtered, the mark can still be reliably read on the decapitated or scalded carcass. The marking must also be tamper-proof and big enough to be easily legible. The process must also be able to be practised on the animal in such a way that the animal suffers neither stress nor any particular pain, and is certainly not injured. The process must also be fast and able to be used anywhere.

The device for carrying out the process must be efficient, so that as many animals as possible can be marked per unit of time. The device must be handy, and therefore mobile, and reliable and easy to operate for trouble-free use in dirty environments, and it must also function without faults in the long-term. The instrument must enable sufficiently individualized marks and a satisfactory variety of characters and, finally, it must be inexpensive enough to purchase and operate to make it financially viable for most large animal keepers.

SUMMARY OF THE INVENTION

This task is accomplished by the apparatus and process for marking animals, which involves using a write head having at least one needle pipe containing movable needles, with the needle pipe being able to he moved via means of a table, which can be motor-driven in two horizontal directions. In this manner, the needle pipe opening is moved over a predetermined markin field on the animal skin. and with the needles are program-controlled for vibrating vertically at predetermined points within the marking field, depending on the characters to be tattooed. The needle tips vibrate out of needle pipe opening and penetrate into the animal skin down to a particular depth, wherein tattooing liquid is pumped downwards through the needle pipe as the needle pipe is moved in at least one of its two directions of movement so that needles are forcibly and permanently surrounded by tattooing liquid.

We will first describe the device as a whole and its most important individual elements, with reference to an embodiment by way of example. The description of the device will then be followed with an explanation of the way it functions and of the process that is claimed.

DETAILED DESCRIPTION OF THE DRAWING AND PREFERRED EMBODIMENTS

Figure 1:
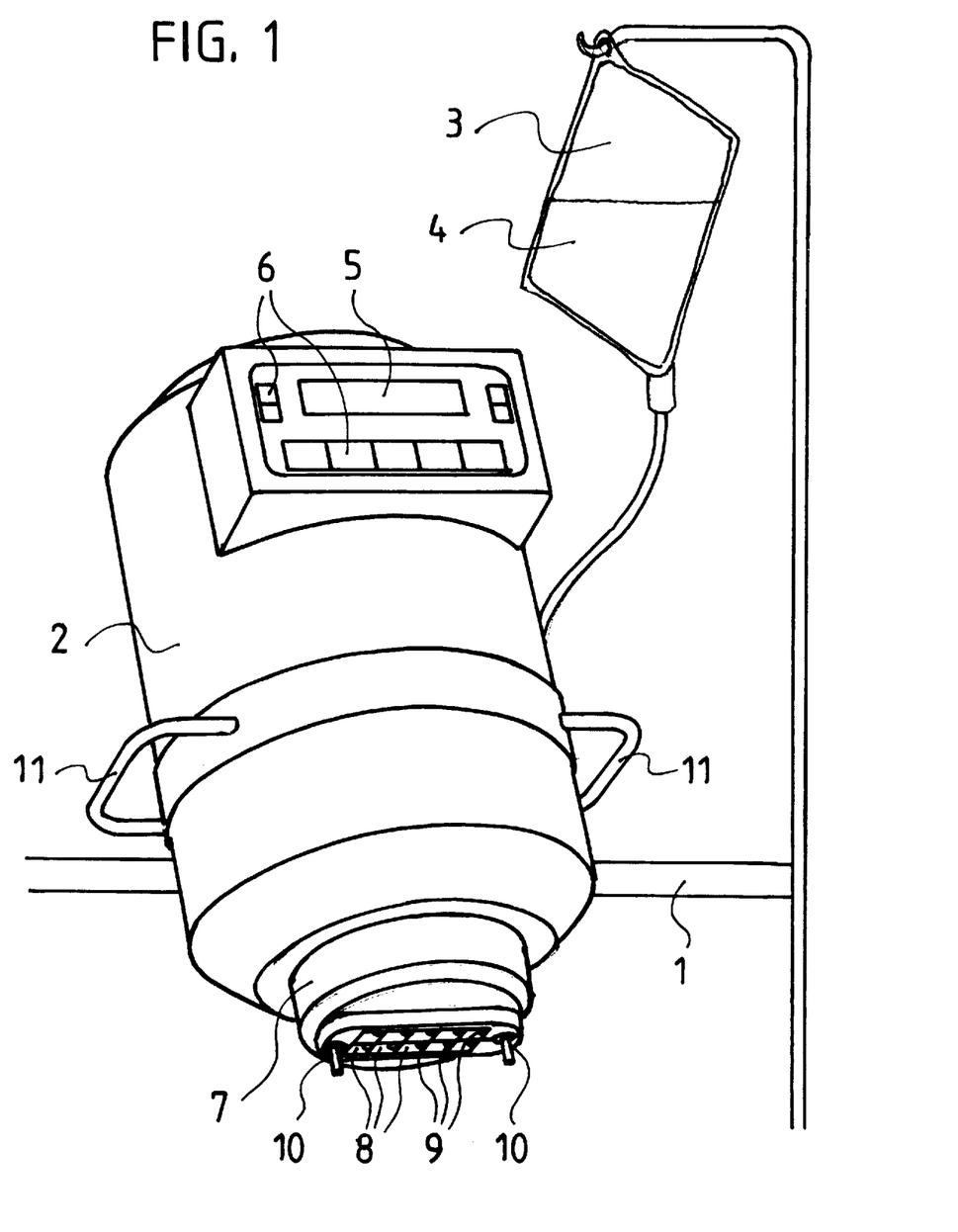
FIG. 1: An overall view of the device for marking animals.

FIG. 1 shows an overall view of the device for marking animals. This device has a frame 1, to which the actual tattooing device with its housing 2 is secured. Suspended from frame 1 there is a bag 3, which contains the tattooing liquid 4. This tattooing liquid is a very homogeneous, light-fast and skin-compatible dye containing pigments which cannot be flushed out from the skin. On its housing 2 the system has a liquid crystal display as the tattoo display 5, and a membrane keyboard 6 for entering the data. It is supplied with electricity at domestic voltages, i.e. either 220 or 110 volts, via a lead. Accommodated behind display 5 in the topmost part of housing 2 there is a transformer, which steps the voltage down to the operating voltage of 24 volts. This low operating voltages ensures that both the operator and the animal being tattooed are protected against dangerous surges of current. The actual write head 7 can be seen at the bottom of the appliance. On its underside it has two rows of five adjacent openings 8, each of which forms a marking field. Visible inside each opening 8 is the opening 9 of a needle pipe, which can move to and from and up and down inside each opening 8. In the situation illustrated, all the needle pipes are shown in their starting positions for tattooing, i.e. in the top right-hand corners of openings 8 when seen from below. Two contact pins 10 can be seen to the left and right of openings 8 on the write head 7. These contact pins 10 can be pushed inwards into write head 7 against the force of a spring. When both contact pins 10 are pushed inwards into write head 7 a writing, i.e. tattooing, process is triggered. The animal to be marked is therefore pressed up with the body site to be tattooed against write head 7, whereupon contact pins 10 are pushed inwards into write head 7 by the animal's body. The animal is held in this position for 3 to 4 seconds until tattooing is finished, which is signalled both visually and acoustically. The operator can therefore only tattoo when the animal's body is held flush against write head 7, otherwise the tattooing process cannot be triggered. The triggering facility is very reliable because neither hand nor foot has to be specially reserved to trigger the tattooing process. Both hands can remain free to grip and hold the animal in a proper fashion. To mark large animals the device can be suspended from a spring, in which case it is gripped by handles 11 and pressed down onto the animal's body, which also triggers the tattooing process.

Figure 2:
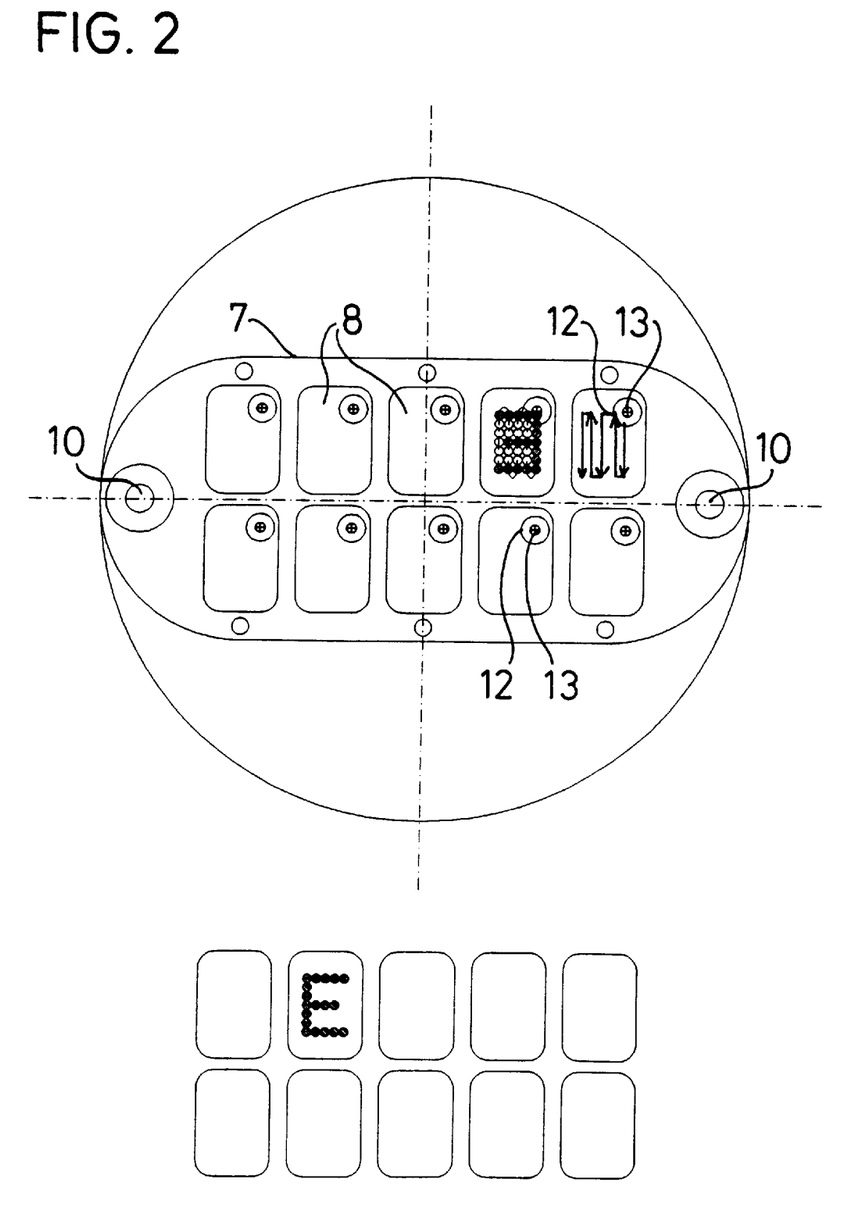
FIG. 2: The write head seen from below in a 1:1 representation and a tattoo created with it underneath.

FIG. 2 shows the write head seen from below in a 1:1 representation. Each opening 8 defines a marking field. When openings 8 are arranged like this, the operator can write two superposed lines of five characters each. Visible inside each opening 8 is the opening of a needle pipe 12, and in each of these needle pipes 12 there are four needles 13 which are grouped together as a bunch. The first character of the top line is written in the field in the top right of the drawing. During the writing, i.e. tattooing, process, the needle pipes 12 inside each opening 8 are guided simultaneously and together so that their openings 9 in respective openings 8 all travel along the path shown in the top right field. The drive for moving the needles along this path is provided by stepping motors which move a table to which needle pipes 12 are ultimately secured in two horizontal directions, as will be described in more detail below. Depending on which character is to be written in a certain marking field, needles 13 in the corresponding needle pipe 12 are made to vibrate at the appropriate points by program-controlled means, so that the needle tips vibrate out of needle pipe opening 9 and penetrate into the skin held against write head 7. At the same time tattooing liquid, which surrounds needles 13 inside needle pipes 12, flows out under pressure from all the needle pipes 12 as they move across the marking field. The illustration underneath write head 7 shows the letter E as written by the needles 13 in the second field from left in the top line of the write head 7 illustrated above.

Figure 3:
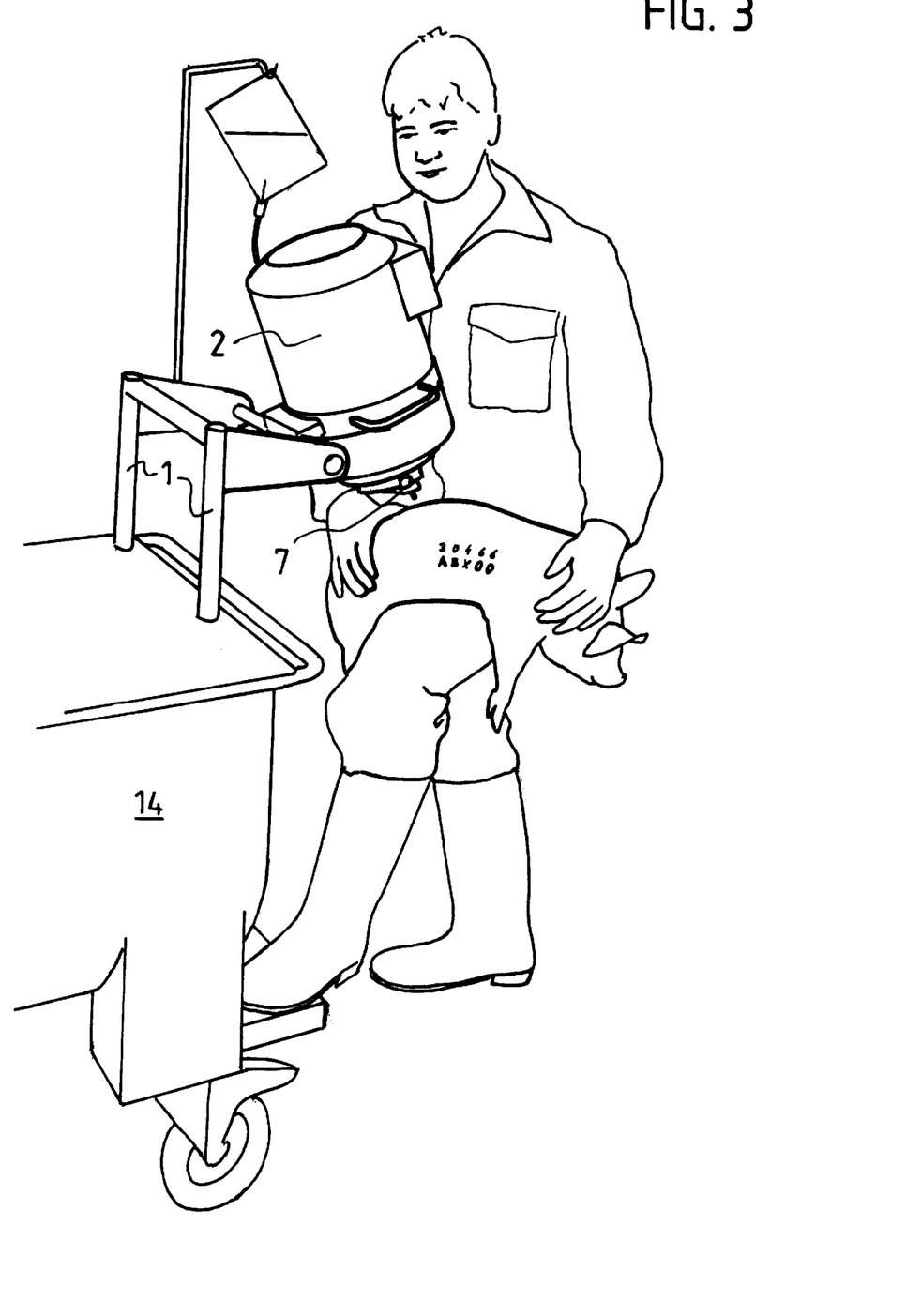
FIG. 3: The device of FIG. 1 being used to tattoo a piglet.

FIG. 3 shows the device in use. As can be seen, the device is attached to a frame 1, which in turn forms an element that can be fixed onto e.g. a food wagon 14. This ensures that the tattooing device is mobile and positioned at a comfortable height. The operator can lay the piglet across his knee and then hold it under write head 7 for 3 to 4 seconds. The piglet does not have to be prepared in any other way. The tattoo site neither has to be shaved or swabbed with tattoo liquid in advance. The tattoo which has just been applied can be seen on the piglet. It is about as big as the palm of a hand. Naturally, the device could also be designed differently. The marking fields, for example, could be arranged or sized differently. More, or indeed fewer, needle pipes could be used and this would not alter the principle of this invention. On completion of tattooing it is important to close off the openings of the needle pipes with a protective cap, for which purpose an airtight cushion is pressed onto the openings to prevent the tattooing liquid from drying out inside the needle pipes.

Figure 4:
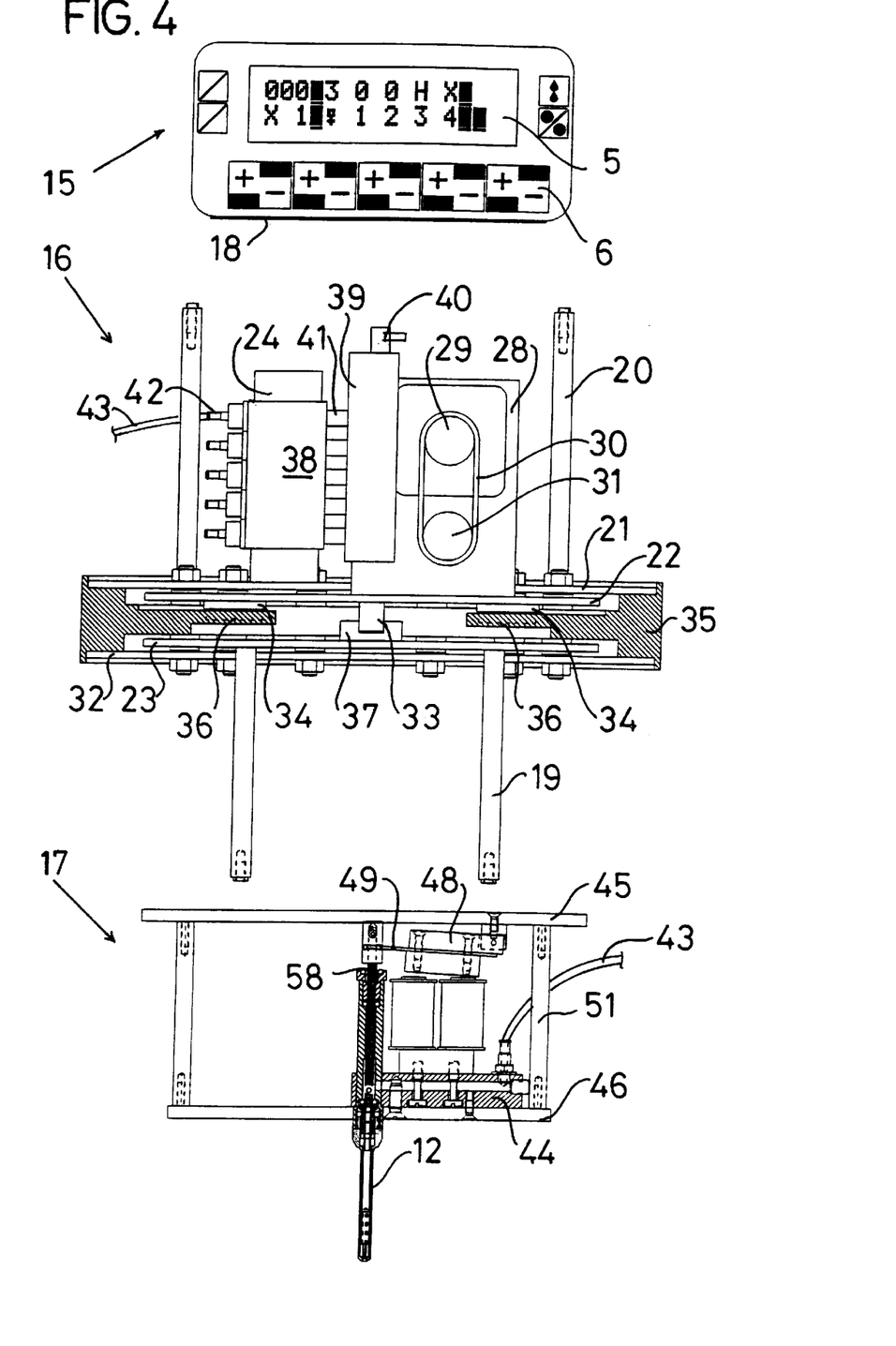
FIG. 4: The inner components of the device of FIGS. 1 and 3 in a diagrammatic linear and two-dimensional exploded diagram viewed from the front.

FIG. 4 shows the key internal components of the device in a diagrammatic linear and two-dimensional exploded drawing. This will make it easier to understand the construction of the overall device. The device is made up of three main modules 15, 16, 17 arranged one on top of the other and connected with each other by means of assembly rods 19, 20. The electric and electronic module 15 is shown at the top. The centre module 16 houses the drive means for moving needle pipes 12 horizontally, as well as the pump device for the tattooing liquid, whilst the bottom module 17 contains needle pipes 12 with the needles and their vibrating systems. The membrane keyboard 6 with the liquid crystal display 5 is drawn in on the electric and electronic module 15. Behind it, on assembly plate 18, is the transformer for stepping down the incoming voltage to the 24 volts operating voltage. The main board with the integrated circuits for the whole electronic system is also mounted on assembly plate 18. This entire electric and electronic module 15 is screwed with assembly plate 18 onto the top ends of assembly rods 20. The module 16 underneath has three plates 21,22,23 arranged parallel to each other, of which the two bottom plates 22,23 can each be moved horizontally in one direction in relation to the plates above 21,22. The top plate 21 is disposed rigidly inside housing 2 of the device. This plate 21 supports the drive means for moving the two plates underneath 22,23, and the pump device for the tattooing liquid. We will start by describing the drive means. These comprise a stepping motor for each one of the two directions of movement of plates 22,23 underneath, these movements being at right angles to each other. Inside component 24, which is rigidly mounted on stationary plate 21, there is a first stepping motor whose driven axle 25 drives a ball screw 27 via a toothed belt 26, said ball screw being thread-mounted in component 28. A ball screw guarantees that the drive is free from play, even when the drive direction is reversed. The bottom of component 28 passes through a recess in plate 21 and is mounted on plate 22. On the top side of plate 22, four square radially running distancing elements 34 are disposed along its periphery and over its circumference. The two distancing elements 34 shown to the left and right of the drawing are mounted in a guide groove formed by plastic elements 50 screwed to the underneath of stationary plate 21. These ensure that plate 22 can only be moved to the left or the right in relation to stationary plate 21. If the stepping motor in component 24 is switched on, component 28 will move to the left or the right in the diagram. This movement is stopped by two limit switches. Inside component 28 there is a second stepping motor whose driven axle 29 drives another ball screw 31 via toothed belt 30. This ball screw 31 is thread-mounted in a component disposed behind component 28, and cannot be seen here. This component passes through the aligned recesses in both stationary plate 21 and plate 22 underneath onto plate 23, to which it is secured. A further four square distancing elements 36 oriented radially to the centre are attached to the underside of plate 22. On the top side of plate 23, the guide grooves running perpendicular to the plane of the sheet of drawings are formed by plastic elements 37. If the stepping motor in component 28 is switched on, plate 23 therefore moves perpendicular to the plane of the sheet of drawings. The to and from movements of bottom plate 23 are also stopped by two limit switches. The intersecting freedom of movement of the two plates 22 and 23 means that every point within a certain field can be reached by plate 23 as a result of the overlapping of the two movements. Hence plate 23 forms a table that can be moved in any direction along the plane and is supported by a ring 32 disposed underneath, on which it is slidingly mounted, and which is connected with stationary plate 21 via an encircling ring 33. The movement of component 24 relative to component 28 on stationary plate 21 causes the needle pipes to move in the general writing direction, and is also directly exploited to drive a pump device for the tattooing liquid. This pump device consists of the two elements 38 and 39 that can be seen here. Two identical elements are secured to the back of components 24 and 28. At the top of element 39 there is an inlet connection 40. This is where a hose is connected, which brings the tattooing liquid from a bag to the pump device. Element 39, which has five identical outgoing tubes 41, acts as a distributor. These tubes 41 project into holes in element 38, inside which they are sealed by means of O-rings. They act as pistons inside element 38. Inside element 38 there are two one-way valves arranged in series, as will be described in more detail below. These one-way valves ensure that during pumping, i.e. when tubes 41 penetrate into element 38 as pistons, no liquid can flow backwards through tubes 41, but is instead pressed out through opening nipple 42. Conversely, when components 24 and 28 move apart, with the result that tubes 41, i.e. the pistons, move back out of element 38, the second one-way valve shuts immediately while the first one opens so that tattooing liquid can flow out of distributor 39 into the space between the two one-way valves. From opening nipples 42, hoses 43 lead to the assembly elements 44 for needle pipes 12 and from there into feed channels 54, through which the tattooing liquid is pumped inside needle pipes 12.

The bottom module 17 contains the vibrating system for the tattooing needles, plus needle pipes 12 and write head 7. These elements are fixed to two parallel assembly plates 45,46 disposed one above the other and held together by four connecting rods 51 distributed around the circumference. The assembly elements 44 for needle pipes 12 are screwed onto the lower assembly plate 46; on the inside, they also form a flow channel for supplying the tattooing liquid. Electromagnets 47 sit on these assembly elements 44, which are pierced from below by screws which pass through the inside of the flow channel. To prevent these screws from blocking up the flow channel they are tapered midway along their length so that liquid can flow around them inside the flow channel. This construction allows space to be saved. Above electromagnets 47, i.e. above the cores of the electromagnets, the magnet armatures 48 are each secured to a vibrating arm 49. Vibrating arms 49 are hinged to the top assembly plate 45 and their ends rest in an element that which impacts on the plunger that holds the needles at its bottom end. A compression spring 58 is disposed between the plunger and the needle pipe so that when at rest, the plunger with the needles lies in its upper position, and hence the needles are retracted behind the bottom opening of needle pipe 12.

Figure 5:
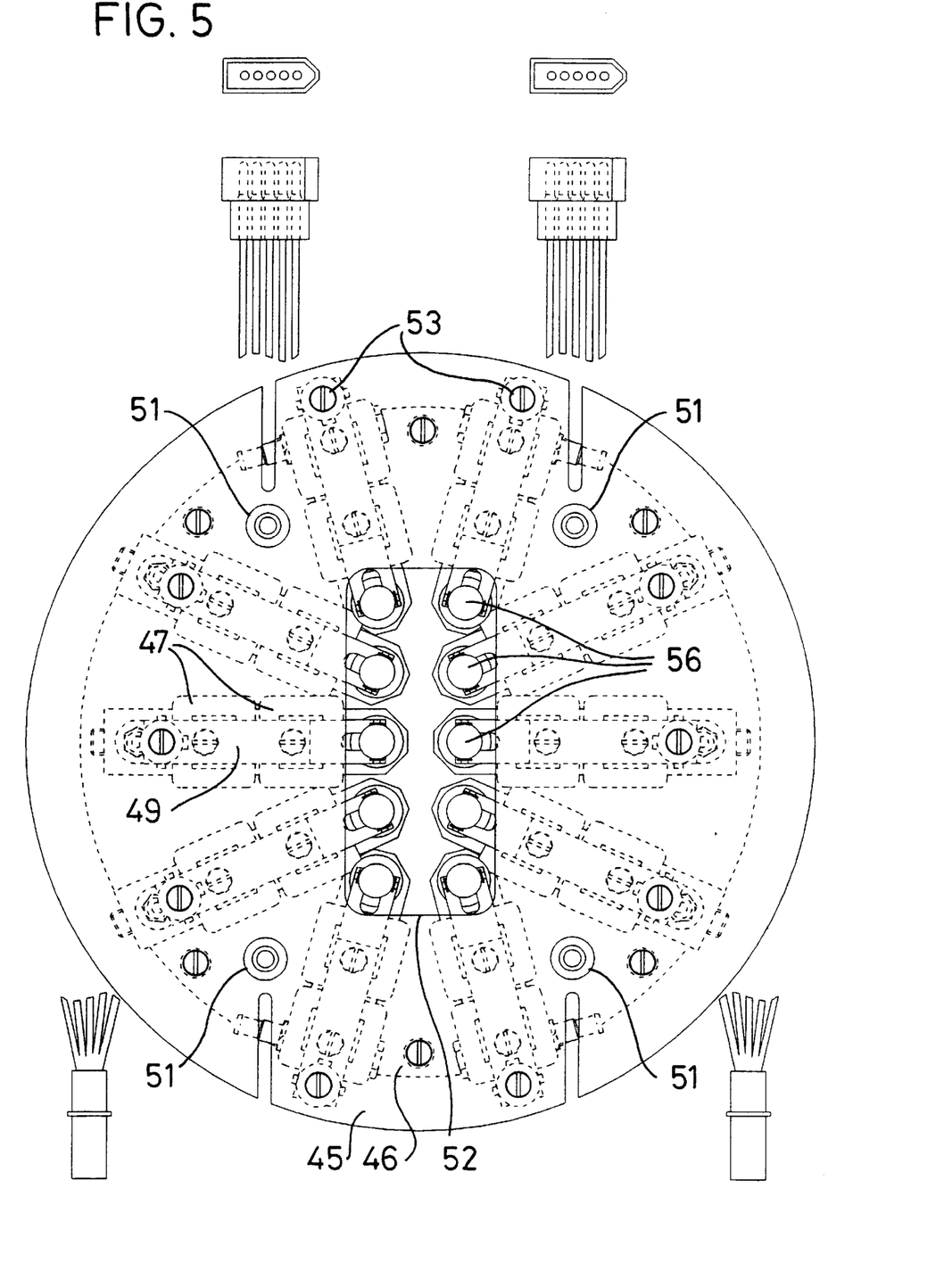
FIG. 5: A horizontal projection of the vibrating device for the needles.

FIG. 5 shows a horizontal projection of the vibrating device for the needles. The bottom assembly plate 46 is indicated by a dashed line and is connected via connecting rods 51 to the top assembly plate 45, which is contrived here with a rectangular recess 52, allowing one to look down on the plunger heads 56 of the individual needle pipes. The elements between the two assembly plates 45,46 are indicated by a dashed line. A vibrating device with its own needle pipe and needle bunch is provided for each of the ten marking fields. The individual vibrating devices are slightly wider than the gaps between adjacent marking fields. To save space, therefore, the vibrating devices for the three central marking fields of each line are arranged at an angle to each other. The two outer pairs of marking fields are also served by vibrating devices disposed at an angle to each other. All ten vibrating devices are arranged space-savingly around the overall periphery of the marking field of the write head, as can readily be seen. Each vibrating device comprises two electromagnets 47. Above these electromagnets 47 runs the magnet armature, which is secured to a vibrating arm 49. One end of vibrating arm 49 is secured to an articulated element which is screwed to the top assembly plate 45 by means of a screw 53. The other end of vibrating arm 49 is mobile and impacts on a plunger, as will be described in relation to FIG. 6.

Figure 6:
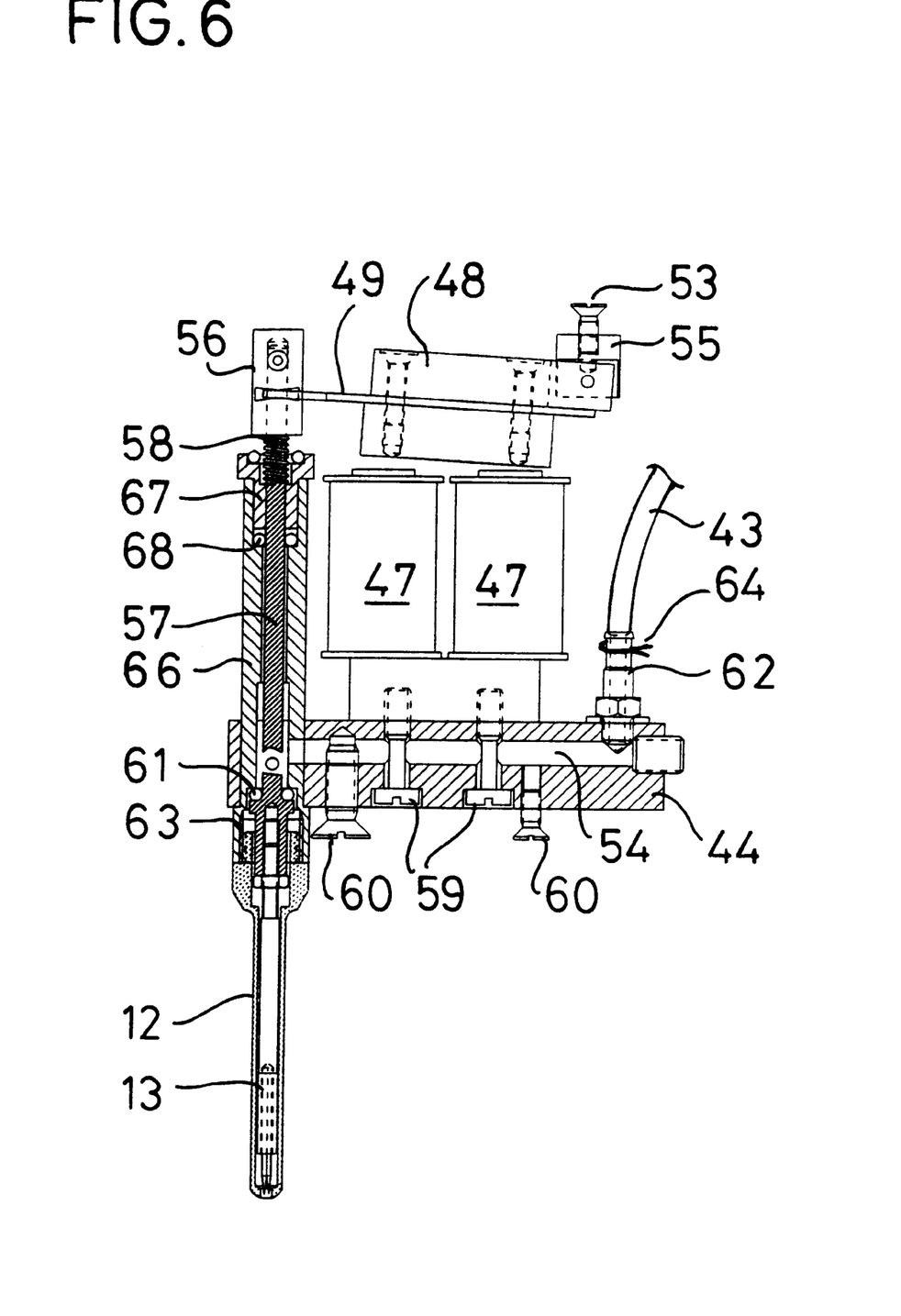
FIG. 6: A needle pipe with feed channel for the tattooing liquid with the associated vibrating device for the needles, viewed from the side.

FIG. 6 shows a side view of an individual needle pipe 12 with feed channel 54 for the tattooing liquid, with the associated vibrating device for needles 13. The vibrating device is mounted on assembly element 44, which forms a steel structure with a bore 54 for supplying the tattooing liquid. Assembly element 44 is screwed onto assembly plate 46, which is not shown here, by means of screws 60. The outer end of bore 54 is sealed by a plug which is not illustrated here. On top of assembly element 44 there is a nipple 62 to which feed hose 43 for the tattooing liquid is connected and secured with a clip 64. Electromagnets 47 are mounted on assembly element 44 and held in place with screws 59. These screws 59 are slightly tapered midway along their length so that they can pass through bore 54 and still allow the tattooing liquid to flow around them. Above electromagnets 47 one can see the magnet armature 48, which is secured to a vibrating arm 49. This vibrating arm 49 is attached via an articulated element 55 by means of screw 53 to top assembly plate 45, which is not shown here. Its end projects into the head 56 of plunger 57. The plunger 57 itself is mounted and moved inside a guiding tube 66 which is inserted in assembly element 44 perpendicular thereto. The bottom opening of this guiding tube 66 has an internal thread 63, into which needle pipe 12 is screwed. Inside needle pipe 12, four needles 13 are gathered into a bunch and moved by needle pipe 12. Towards the bottom end of plunger 57 there is an upwardly directed shoulder on which lies an O-ring 61 which in turn abuts against a shoulder in guiding tube 66. Above O-ring 61, bore 54 opens out into guiding tube 66. Screwed into the top end of guiding tube 66 there is a sealing element 67 which presses down on an O-ring 68 and seals off plunger 57 at the top. Between the sealing element 67 and the plunger head 56 there is a compression spring 58 which keeps plunger 57 pressed upwards, with the bottom O-ring 61 sealing off guide tube 66 at the bottom. If voltage is applied to electromagnet 47, however, magnet armature 48 is drawn downwards, whereupon plunger 57 is also pressed downwards by vibrating arm 49 against the force of compression spring 58. When this happens, the bottom of plunger 57 opens the passage for the tattooing liquid so that it can flow around the bottom end of plunger 57 and be pumped inside needle pipe 12, where it fills out the space between the needles 13 mounted inside and the inside of the needle pipe, flowing round needles 13 as it does so. When alternating voltage at 50Hz is applied to electromagnets 47, plunger 57 also vibrates at 50Hz and the tattooing liquid flows accordingly, with an intermittent, almost fast movement, along needles 13 to the tattooing site.

Figure 7:
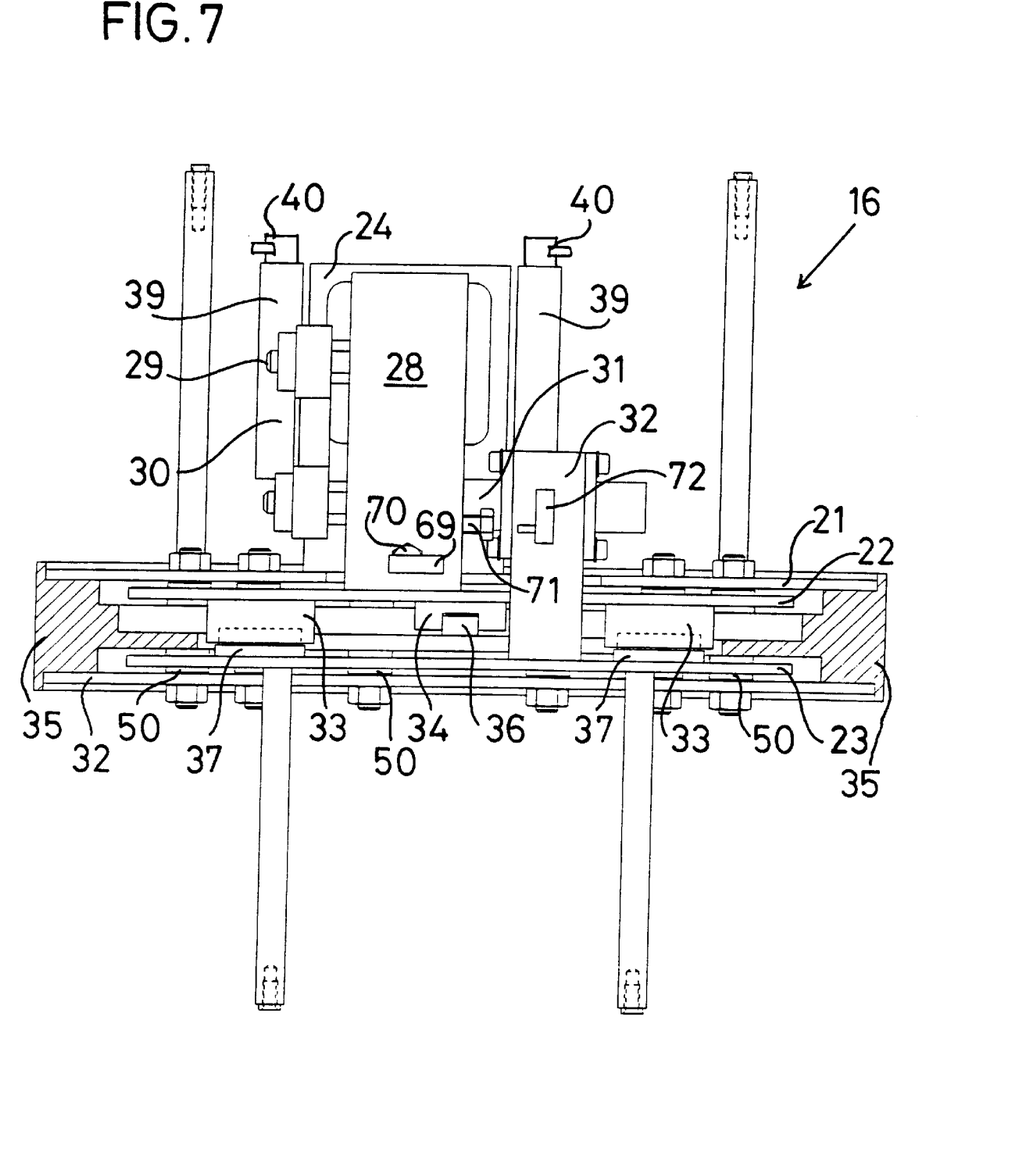
FIG. 7: The table that can be motor-driven in two horizontal directions, with its drives and the pump device seen from the right-hand side in relation to the illustration in FIG. 4.

FIG. 7 shows the module 16 that is shown from the front in FIG. 4 with the table that can be moved horizontally in two directions, together with its drive means and the pump device, but now viewed from the right-hand side in relation to the illustration in FIG. 4. As already described, this module 16 has three parallel plates 21,22,23, of which the two bottom ones 22,23, can each be moved in one direction horizontal to the plate above. The top plate 21 is stationary. This plate 21 supports the drive means for each one of the two directions of movement of plates 22,23 underneath, these movements being at right angle to each other. Inside component 24, which is rigidly mounted on stationary plate 21, there is a first stepping motor which is connected to component 28 via a ball screw. The bottom of component 28 passes through a recess in plate 21 and is mounted on plate 22. On the top side of plate 22, four radially running distancing elements 34 are disposed along its periphery and over its circumference. The front guide element 34 and the rear guide element 34, which is not visible in the drawing, are mounted in a guide groove formed by plastic elements 35 screwed into the underside of stationary plate 21. These ensure that plate 22 can only be moved forwards or backwards in relation to stationary plate 21. If the stepping motor in component 24 is switched on, component 28 will move forwards or backwards in this diagram. This movement is stopped by two limit switches, of which the front limit switch 69 is shown here, mounted on stationary plate 21. A screw 70 on component 28 activates it. Inside component 28 there is a second stepping motor, whose driven axle 29 drives another ball screw 31 via toothed belt 30. This ball screw is thread-mounted in component 32. Component 32 passes through the aligned recesses in both stationary plate 21 and plate 22 underneath onto plate 23, to which it is secured. Attached to the underside of plate 22 there are four square distancing elements 36 oriented radially towards the centre. Mounted opposite each other on top of plate 23 there are two plastic elements 37, which act as guide grooves for the distancing elements 36 mounted inside them. If the stepping motor in component 28 is switched on, plate 23 therefore moves to and from along the plane of the sheet of the drawing. These movements of bottom plate 23 are also stopped by two limit switches. One of these limit switches 72, which is attached to component 32, is illustrated. It is activated by the screw 71 on component 28. The intersecting freedom of movement of the two plates 22 and 23 means that every point within a certain field can be reached as a result of the overlapping of the two movements. Plate 23 is supported by a ring 32 disposed underneath, on which it is slidingly mounted by means of sliding bearings 50, the outside of which is connected outside with stationary plate 21 via an encircling ring 33. The movement of component 24 relative to component 28 on stationary plate 21 is also directly exploited to operate a pump device for the tattooing liquid. This view only shows elements 39 of the pump device, which have an inlet connection 40 at the top. This is where hoses that bring the tattooing liquid from a bag to the pump device are connected. Element 39 acts as a distributor, in that it has five identical tubes 41 which project out of the back and cannot therefore be seen here. These tubes 41 enter into holes in element 38 behind, and are leak-tightly mounted in it by means of O-rings. They act as pistons in element 38.

Figure 8:
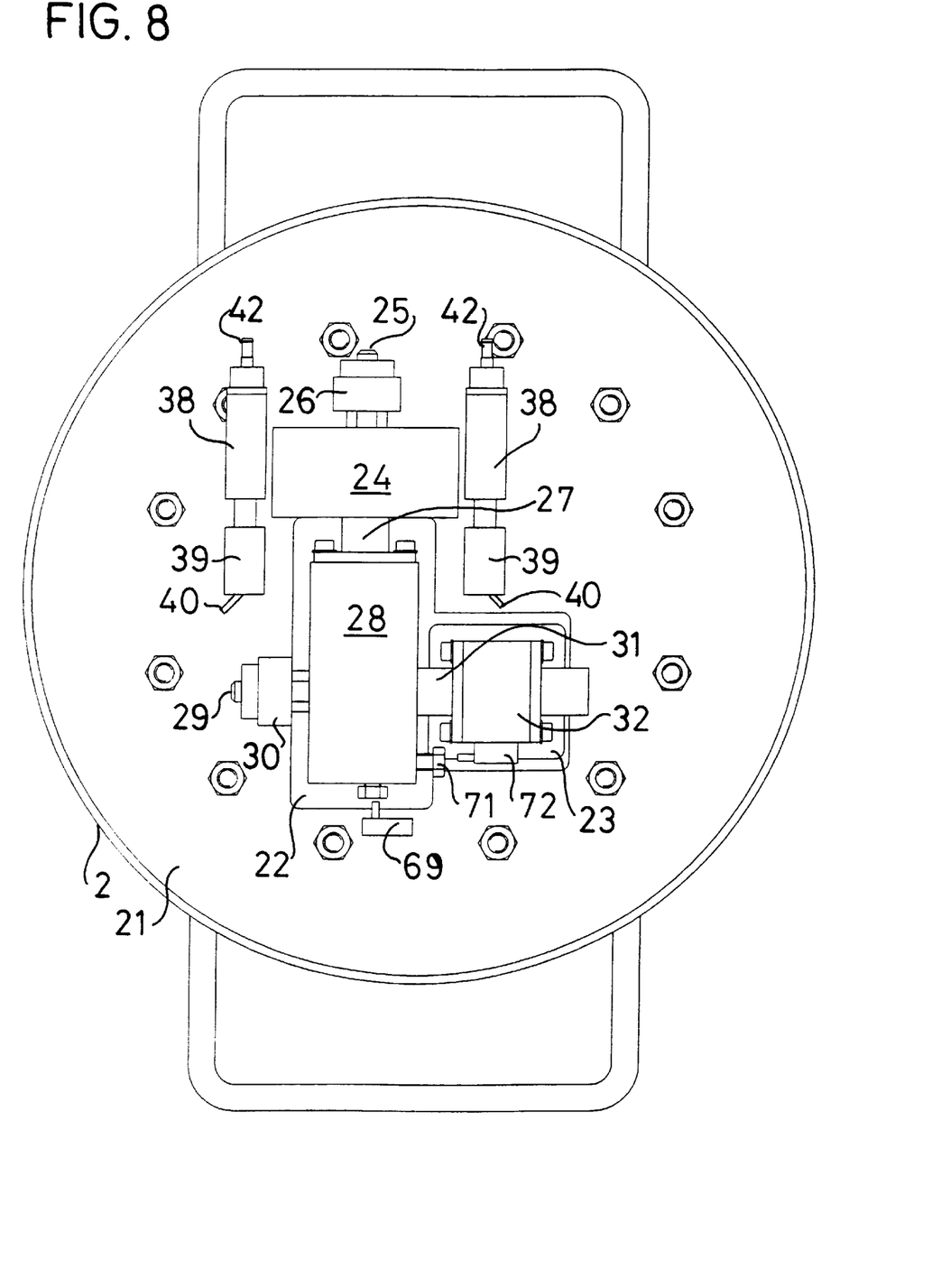
FIG. 8: The table that can be motor-driven in two horizontal directions, with its drives and the pump device, seen from above.

Finally, FIG. 8 shows the centre module 16 of FIG. 4 seen from above. Fixed rigidly in housing 2, one can see the top plate 21, on which component 24 is mounted. Inside component 24 there is the first stepping motor, whose driven axle 25 drives ball screw 27 via toothed belt 26, said ball screw being thread-mounted in component 28. The bottom of component 28 passes through a recess in plate 21 and is mounted on plate 22. If the stepping motor in component 24 is operated, component 28 moves up and down along the plane of the diagram, until the drive is stopped by a limit switch 69. Component 28 accommodates the second stepping motor, whose driven axle 29 drives another ball screw 31 via toothed belt 30. This ball screw 31 is thread-mounted in a component 32 that is arranged on the right of component 28. This component 32 passes through the aligned recesses in both stationary plate 21 and plate 22 underneath onto plate 23, to which it is secured. If the stepping motor in component 28 is switched on, plate 23 therefore moves to the left or right along the plane of the diagram. The to and from movements of bottom plate 23 are also stopped by two limit switches 72. The intersecting freedom of movement of the two plates 22 and 23 means that plate 23 can be moved in any direction with respect to stationary plate 21. The movement of component 24 relative to component 28 on stationary plate 21 is also directly exploited to drive a pump device for the tattooing liquid.

Figure 9:
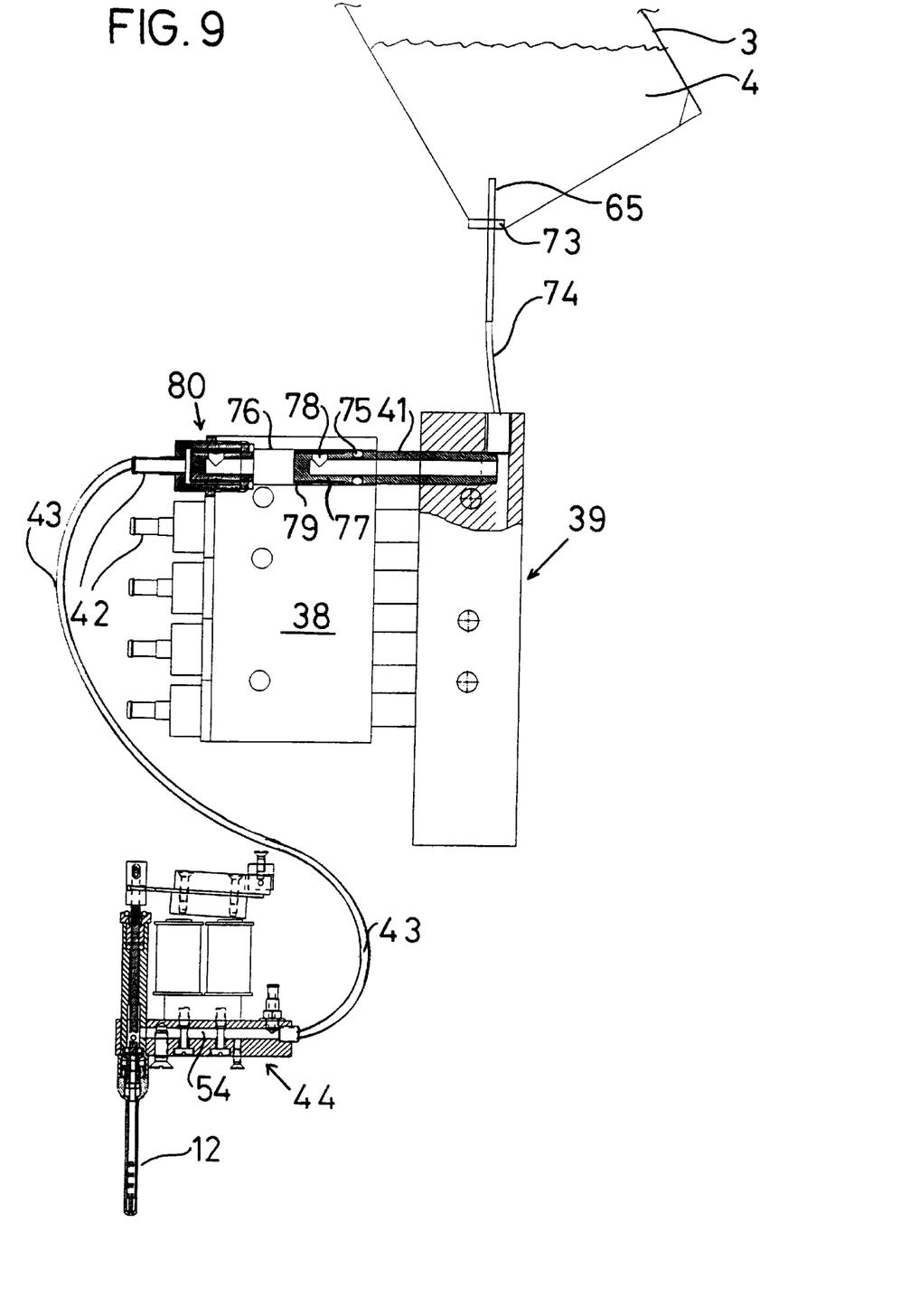
FIG. 9: The route taken by the tattooing liquid and the pump device shown as a partial section.

FIG. 9 shows the route taken by the tattooing liquid, and the pump device in a partial section. The tattooing liquid is contained in a bag 3, which is suspended from the frame of the appliance. Bag 3 itself reveals the level of the liquid inside, either because bag 3 is transparent, or because of the way it bulges. A further advantage of bag 3 is that air does not have to be introduced into bag 3 before tattooing liquid will flow out at the bottom, the volume of the bag simply diminishes instead. This provides a clever means of ensuring that air cannot get into the flow system for the tattooing liquid. The bag is connected to the flow system by pushing a hollow needle 65 through the sealing cap 73 at the bottom of the bag. For this purpose sealing cap 73 has a rubber plug which is pierced by hollow needle 65 to tap the liquid. When the bag is empty, it can be replaced by a new, full bag by simply removing hollow needle 65 and inserting it into the sealing plug of the new bag without any air getting into the flow system. The tattooing liquid flows through a tube 74 into distributor 39 and from there through the five tubes 41 into pump housing 38, of which the top part is shown here in a section. Proceeding from the two distributors 39, which are disposed on each side of component 28, there is a separate line for each needle tube, in which liquid is also pumped separately. The pump device for each line is contrived as follows: an O-ring 75 seals off tube 41 inside cylinder 76, which runs through pump housing 38. The inside of the cylinder is chemically nickel-plated and thermally post-treated to ensure that the O-ring does not seize up. The front end of tube 41, which acts as a piston, is tapered and sealed at the end. Radial bores 78 are contrived in the taper 77, and a hose section 79 is fitted over taper 77, so that the end of the piston functions as a one-way valve in the same way as a bicycle hose valve. Further forwards inside cylinder 76 there is another identically structured, identically oriented one-way valve 80. The advantage of one-way valves of this construction is that they react immediately in both directions. If the piston travels into cylinder 76, the one-way valve at its end is leakproof, i.e. hose section 79 lies snugly on taper 77 and closes the radial bores 78 inside. The identical one-way valve located further forwards in the cylinder opens when the piston pumps, because the hose section expands slightly under the pressure of the liquid pumped out through the radial bores, so that the liquid can flow underneath it long the taper and towards the front. If the piston reverses after a full stroke, an underpressure is created between the two one-way valves, causing hose section 79 to stretch slightly on taper 77 of the piston, so that liquid can flow through bores 78 underneath hose section 79 on taper 77 into the space between the one-way valves, whilst the front one-way valve remains closed because the underpressure there draws the hose section through the bores onto the taper, so that the hose section seals off the taper. The pump strokes coincide with the paths which the needle tubes in the openings in the write head travel along in the direction transverse to the height of the letter. In the example described this value is 6.5 mm. Cylinder 76 has a diameter of 7 mm, so that each of the 10 pistons pumps 250 mm$^3$ at every stroke, which corresponds to a total of 2500 mm$^3$ or 2.5 ml. This is the volume that is pumped during each tattooing process. The system pumps whenever the needle tubes move transversely in the writing direction in the openings of the write head. For a total of five vertical movements of the needle tubes during writing there are four intervening transverse movements during which the system pumps. At the front end, cylinder 76 ends in a nipple 42, over which is fitted a hose 43, which leads to an assembly element 44 for a needle tube 12. From this assembly element 44 the tattooing liquid passes through a feed channel 54 into needle pipe 12, inside which it flows around the needles and finally onto and into the animal's skin.

Figure 10:
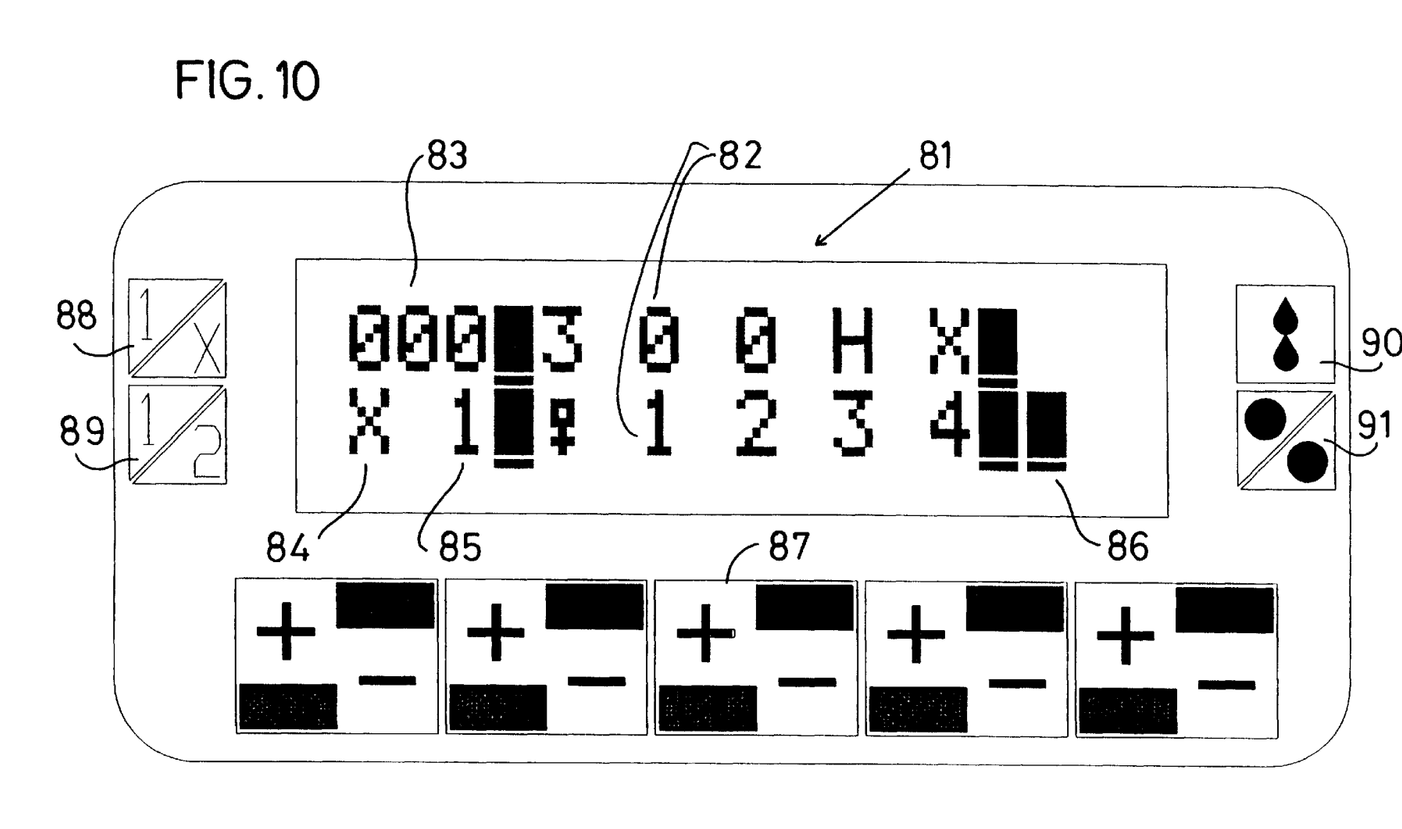
FIG. 10: The tattooing display and the membrane keyboard.

FIG. 10 shows the membrane keyboard and the membrane display. The great advantage of a membrane keyboard is that the appliance will work reliably even in a dirty and dusty environment, because all the electric and electronic components remain virtually hermetically sealed off from the surrounding air. The display, the input functions and the associated electronics give the user a wide variety of options. These will be described below for the sake of clarity. The display features two lines with 12 positions in each line. Five positions in each line indicate the characters that the write head will tattoo into the animal during the next tattooing manoeuvre. For each of the ten positions of the tattooing display, the operator can choose between 46 characters, e.g. the numbers 0 to 9, the letters A to Z, plus ä, ö and ü. The characters *, +,-, &, ♂ and ♀ can also be represented as well. Each tattoo is counted by the appliance and indicated at display 83 by a three-figure number at top left in the first line, next to the tattoo display. This number will start to flash after one hundred tattoos. Key 91 is held down to re-set the counter to zero, and the operator can then carry on working with the appliance. If display position 84 shows a 1, the tattoo shown on the display can only be applied once. Display position 84 will flash after the tattoo has been applied. The operator then has to enter a new tattoo before a new tattooing manoeuvre can be triggered. Key 88 allows the operator to switch over to the multiple tattoo function, in which case position 84 will indicate the letter X on a permanent basis. By pressing key 91 briefly, the operator can activate the top or bottom line of the display to enter characters. Key 91 also triggers the drive for the pump device for the tattooing liquid, so that the pump is operated five times consecutively. This serves to evacuate air from the lines in case air is sucked in for any reason. By repeatedly pressing key 89, the operator can choose between three operating modes, which are indicated at position 85 by the numbers 1, 2 or 3. This means the operator can, for example, continuously tattoo a special character for three different stalls, or differentiate between animals for fattening, breeding or other purposes. Each position in the activated line in the tattoo display can be set using the individual keys of the keyboard 87, either by pressing the + key to move upwards through the series of characters, or by pressing the − key to move downwards through the series of characters. As soon as the desired character is set, the animal can be grasped and held under the write head. Tattooing is complete after three to four seconds, and the display flashes at position 84 if the appliance is set to once-only tattooing mode. The tattoo can be altered by entering or altering one or more positions, whereupon the appliance is then ready again for the next tattoo. The electronic display is therefore programmed in a very simple, user-friendly way to allow standardized or individual markings based on number codes and symbols.

Figure 11:
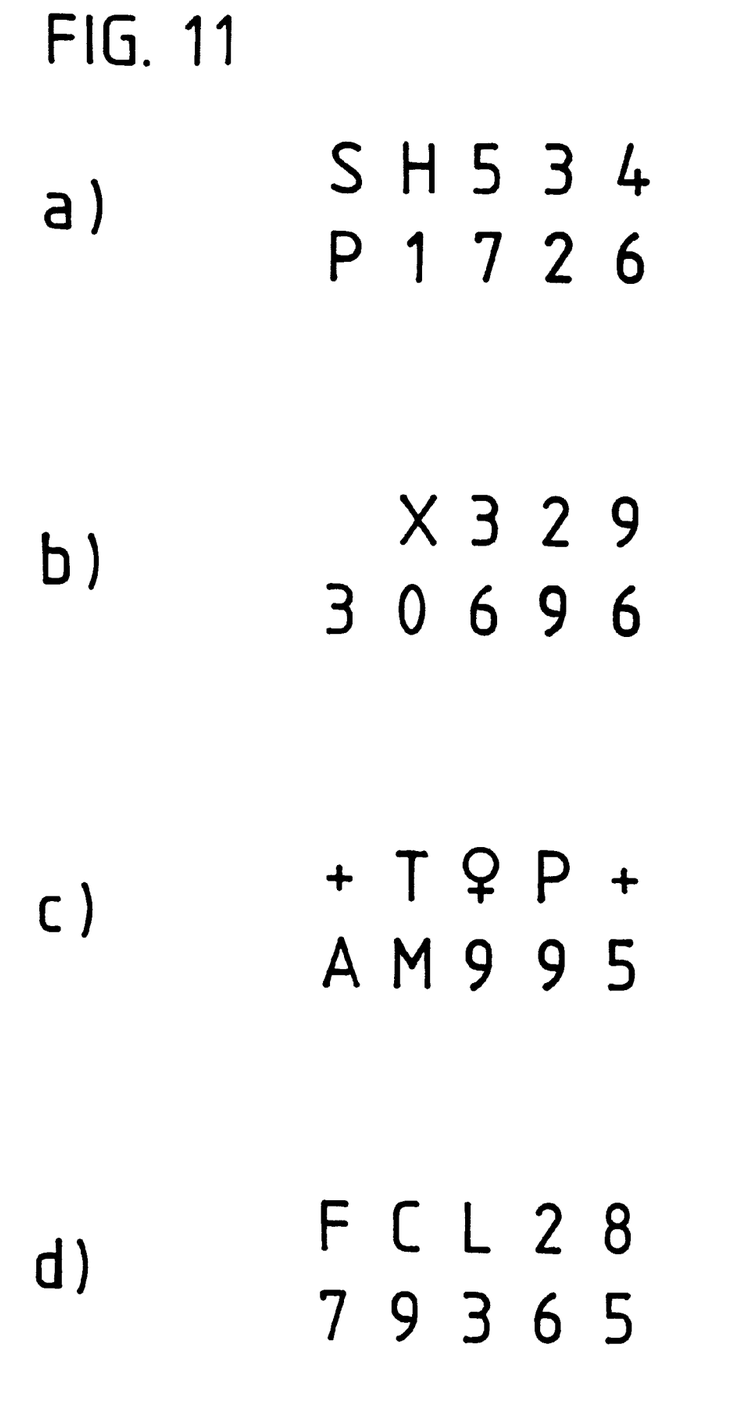
FIG. 11: Four different tattoos a) to d) by way of examples.

FIG. 11 shows four different marking options by way of examples: illustration a) shows a sub-division in which the two letters SH to the left of the top line are used for the male pig and the three-figure number 534 on the right for the mother animal. In the bottom line, P17 on the left indicates the piglet number, and next to it on the right the week of birth, 26. Illustration b) shows an alternative in which the X on the left at the top identifies the farm, with the litter number to the right. The date of birth, Jun. 30 1996, is indicated underneath by the number 30696. In illustration c), the first line shows a trademark or a quality logo, whilst the AM995 in the bottom line is a consecutive piglet number. Finally, illustration d) shows a co-operative marking at top left, namely FCL, with the family number, 28, next to it on the right. The 79 on the left in the second line indicates the birth weight, 7.9 kg, with the number of the day on the right, in this case 365, i.e. the last calendar day of the year. Many other combinations can also be used, of course, depending on the needs and preferences of the user. It is also possible to transfer the tattooed data direct from the appliance to a computer, where they can be entered in a database for further processing.

This device and method for marking animals allows the operator to tattoo an individual and absolutely tamper-proof identification directly and virtually painlessly onto an animal's body in only three to four seconds. The high-performance write head and the electronically regulated supply of dye ensure a tattoo that is neat and always legible. The appliance described here tattoos characters of 8×12 mm and an overall tattoo size of 32×70 mm. The tattoo grows with the animal, so that after 26 weeks, a tattoo on a piglet will be about 80×170 mm and therefore easy to read, even from a distance of several meters.

The precise needle penetration depth of maximum 2 mm and the special skin-compatible dye prevent any injury and eliminate any risk of infection. The appliance's high tattooing capacity allows between 50 and 100 animals to be marked per hour.

What is claimed is:

1. A process for marking animals, comprising the steps of:
   writing with a write head having at least one needle pipe containing movable needles with the needle pipe capable of being moved via a table motor driven in two horizontal directions, so that an opening of the needle pipe is moved over a predetermined marking field on the animal's skin for writing thereon;
   program-controlling the movable needles for vibrating vertically at predetermined points within the predetermined marking field, depending on the characters to be tattooed, so that needle tips vibrate out of the opening of the needle pipe and penetrate into the animal's skin down to a particular depth; and,
   pumping tattooing liquid downwardly through the needle pipe as the needle pipe is moved in at least one of its two directions of movement, so that needles are forcibly and permanently surrounded by the tattooing liquid.

2. The process for marking animals of claim 1, wherein said pumping step is carried out by using a mechanical drive for at least one of the directions of movement of the needle pipes.

3. The process for marking animals of claim 1, wherein said pumping step is carried out by pumping the tattooing liquid from a bag within an air-free system to the opening of the needle pipe.

4. The process for marking animals of claim 1, further comprising the steps of:

a) for each tattooing manoeuvre the tattoo to be applied by program-controlled means is entered via a membrane keyboard;

b) the animal is held under the write head to trigger the tattooing process;

c) the animal is held under the write head during the tattooing process; and, d) the animal is released and this is then followed by step a).

5. An apparatus for marking animals, comprising at least one needle pipe containing movable needles, with the needle pipe being secured to a table which is capable of being motor-driven in two horizontal directions, so that an opening for the needle pipe is movable over a predetermined marking field on an animal's skin, and with program-controlled means for making the needles vibrate vertically at predetermined points within the predetermined marking field, depending on the characters to be tattooed, so that needle tips vibrate out of the opening of the needle pipe and penetrate into the animal's skin downward to a particular depth, and a pumping device for pumping the tattooing liquid downwards through the needle pipe so that needles are forcibly and permanently surrounded by tattooing liquid during pumping.

6. The apparatus according to claim 5, further comprising a group of ten needle pipes containing movable needles, which are disposed in two superimposed lines with five needle pipes each in corresponding openings in a stationary write head, said needle pipes being secured together with vibrating devices to a first plate via motor-driven means in two horizontal directions, and in that two stepping motors, with each said stepping motor having a ball screw, being provided for moving said first plate, a first said stepping motor being secured to a stationary plate arranged parallel to said first plate, and a second said stepping motor being secured to a second plate arranged parallel underneath and mounted so that said second plate is displaceable one-dimensionally with respect to said stationary plate, with said ball screw of the second said stepping motor interacting with a component secured to said first plate that is movable in two dimensions.

7. The apparatus of claim 5, wherein the pumping device includes at least one pipe sealed at its end by a one-way valve, which is pushable as a piston into a piston cylinder in which there is a second, identically oriented one-way valve, and in that said piston cylinder is connected with a first component which executes a movement relative to a second component on which said piston cylinder is mounted.

8. The apparatus of claim 7, wherein the one-way valves in said piston cylinder and an additional cylinder are formed by pipe tapers which are sealed off at one end and have at least one radial bore, and in that a hose section is fitted over their tapered surfaces, which seals off the radial bores under pressure from outside and opens them under pressure from inside via a resultant expansion in hose section.

9. The apparatus of claim 5, further comprising a bag for the tattooing liquid, said bag being tapped from underneath by a hollow needle, so that the tattooing liquid can be drawn free of air into a flow system without air having to flow back into the bag, and in that the tattooing liquid for each said needle pipe can be pumped by separate said pumping devices comprising a piston and a cylinder.

10. The apparatus of claim 5, further comprising a liquid crystal display as the tattoo display, and a membrane keyboard for entering data so that inside of the entire apparatus is hermetically sealed off from the surrounding air.

\* \* \* \* \*